United States Patent Office 3,332,945
Patented July 25, 1967

3,332,945
PRODUCTION OF THE LOWER ALKYL ESTERS OF DI- OR TRI(2-CARBOXYETHYL)ISOCYANURATE
Charles R. Walter, Jr., Hopewell, and Donald Pickens, Chester, Va., assignors to Allied Chemical Corporation, New York, N.Y., a corporation of New York
No Drawing. Filed Aug. 4, 1964, Ser. No. 387,476
9 Claims. (Cl. 260—248)

The present invention relates to a process for the production of N-substituted isocyanurates. More particularly, the present invention relates to a method of producing lower alkyl esters of di- and tri(2-carboxyethyl)isocyanurate.

Lower alkyl esters of di- and tri(2-carboxyethyl)isocyanurate and a process for their production are discussed in co-pending U.S. application Ser. No. 814,671 filed May 21, 1959, now U.S. Patent 3,235,553 issued Feb. 15, 1966, and assigned to the assignee of the instant application. The process described therein involves carrying out the following procedures; cyanoethylating cyanuric acid to obtain the cyanoethyl derivative, hydrolyzing the cyanoethyl derivative so produced to obtain the corresponding carboxyethyl derivative and thereafter reacting the carboxyethyl derivatives so obtained with a lower alcohol to produce the lower alkyl ester of the carboxy derivative. While the foregoing procedure provides satisfactory results, obviously several time consuming and expensive operations are required to produce the final product.

It has now been discovered that lower alkyl esters of di- and tri(2-carboxyethyl)isocyanurate can be directly obtained in good yields by reacting cyanuric acid with a lower alkyl ester of acrylic acid in the presence of a strongly alkaline catalyst and in a reaction medium containing a solvent for the reactants. An additional feature of the present invention resides in the discovery that the yield obtained from such a procedure can be greatly improved by carrying out the reaction in the presence of an antioxidant polymerization inhibitor.

In carrying out the process of the present invention a lower alkyl ester of acrylic acid is added to a solution of cyanuric acid containing a small amount of a strongly alkaline material which functions as a catalyst and preferably a small amount of an antioxidant polymerization inhibitor. To obtain a satisfactory yield of the tri-substituted derivative, at least about 3 moles of acrylate ester should be used per mole of cyanuric acid. The acrylate ester is preferably added in small portions with stirring of the mixture so as to avoid polymerization of said ester. When all of the acrylate ester has been added to the solution of cyanuric acid, the resulting mixture is then heated to the boiling temperature with refluxing of the vapors until the reaction is completed. It is normally sufficient to heat the mixture within a range of about 100–150° C. over a period of about 0.5 to 5 hours to complete the reaction.

The crude reaction product containing the lower alkyl ester of tri(2-carboxyethyl)isocyanurate is relatively insoluble in water and may be separated from the reaction mixture by dilution of the reaction mixture with water. The lower alkyl ester of tri(2-carboxyethyl-isocyanurate product generally separates as an oil which crystallizes on standing. A substantially pure product can be obtained by recrystallization of the crude product from a solvent.

As indicated above, at least about 3 moles of acrylate ester per mole of cyanuric acid should be used to obtain satisfactory yields of the tri-substituted derivative. This yield is not advantageously improved when more than about 5 moles of acrylate ester per mole of cyanuric acid is used. By using less than 3 moles, e.g. about 2 moles of acrylate ester per mole of cyanuric acid, satisfactory yields of the di-substituted derivative may be obtained.

Lower alkyl esters of acrylic acid which may be used in the process of the present invention include methyl acrylate, ethyl acrylate, propyl acrylate, and butyl acrylate. Particularly good results have been obtained by the use of ethyl acrylate.

Various strongly alkaline materials may be utilized as catalysts in the process of the present invention. Preferably strongly basic organic cationic compounds and especially the quaternary ammonium basis are employed as catalysts since they are readily soluble in the organic solvents used as reaction media. Suitable quaternary ammonium basis include trimethylbenzyl ammonium hydroxide (Triton B), tetramethyl ammonium hydroxide, tetraethyl ammonium hydroxide and N-dimethylpiperidinium ammonium hydroxide with particularly good results having been obtained by the use of Triton B. Normally, small amounts on the order of about 1 to 5% by weight of the acrylate ester of the above-described catalysts function satisfactorily to effect the desired reaction.

Any solvent which dissolves the reactants and the initial reaction products as well as being inert thereto and stable under the reaction conditions of the process of the present invention may be employed. Among the solvents found particularly satisfactory for use in the instant process are dimethylformamide and 1-methyl-2-pyrrolidone.

As indicated above, particularly good yields from the process of the present invention are obtained by carrying out the reaction in the presence of an antioxidant which functions as a polymerization inhibitor for the lower alkyl esters of acrylic acid. Any antioxidant polymerization inhibitor which does not enter into the desired reaction while preventing polymerization of the acrylate esters may be satisfactorily employed in the process of the present invention. Particularly good results have been obtained from the use of substituted phenols and dihydroxybenzenes and in particular by the use of hydroquinone. Normally, an amount of antioxidant equal to 1 to 2% by weight of the acrylate ester is satisfactory to prevent polymerization of said ester in the instant process.

The lower alkyl esters of di- and tri(2-carboxyethyl)-isocyanurate are particularly useful in the manufacture of synthetic resins. They may be employed in the preparation of polyesters by reaction with polyhydric alcohols or polyamines. The products of such reactions may be further reacted with isocyanates to produce polyurethane products useful in the manufacture of foamed articles. The polyesters themselves are useful in a variety of applications including coating compositions. Further examples of the use of lower alkyl esters of di- and tri(2-carboxyethyl)isocyanurate are discussed in U.S. application Ser. No. 814,671 mentioned above.

The present invention will be illustrated by the following specific examples, but it is to be understood that it is not limited to the details thereof and that changes may be made without departing from the scope and spirit of the invention. Temperatures are given in degrees centigrade and parts and percentages are by weight unless otherwise specified.

EXAMPLE 1

A 1 liter 3 neck flask fitted with stirrer, water condenser and a thermometer positioned to take a liquid temperature is used. About 333 ml. dimethylformamide, 51.6 grams (0.4 mole) cyanuric acid and 16 ml. 35% Triton B in methanol are placed in the flask and 160 grams (1.6 moles) of ethyl acrylate is then added to the slurry over a period of 40 minutes while the temperature of the flask is maintained at 38 to 48 degrees. After all of the ethyl acrylate is added, the mixture is then refluxed for 3 hours during which time the liquid temperature rises from 104° to 130°. The crude product is separated by diluting the reaction mixture with 3 to 4 volumes of ice water and filtering. The dried crude tri(2-carbethoxyethyl)isocyanurate weighs 76.5 grams (44.5% yield) and melts at 52° to 54°. A pure product melting at 58.5° to 59.5° may be obtained by recrystallization of the crude product from isopropyl ether.

EXAMPLE 2

Into the flask of the apparatus described in Example 1, 51.6 grams (0.4 mole) cyanuric acid, 335 ml. dimethylformamide, 17 ml. of 35% Triton B solution in methanol and 1.6 grams hydroquinone are placed. About 160 grams (1.6 moles) ethyl acrylate is then added over a period of 1.75 hours while the temperature of the mixture is gradually increased from 33° to 125°. The mixture is then refluxed for 3 hours at the end of which time the temperature is 133° and the mixture is a clear solution. The desired product is then recovered as described in Example 1. 111.5 grams (65% yield) of dried crude tri(2-carbethoxyethyl)isocyanurate melting at 51° to 55° was obtained.

We claim:

1. The method of preparing lower alkyl esters of di- or tri(2-carboxyethyl)isocyanurate which comprises heating a solution of cyanuric acid and a lower alkyl ester of acrylic acid in the presence of a strongly alkaline catalyst and recovering the resultant lower alkyl ester of di- or tri(2-carboxyethyl)isocyanurate product.

2. The method of claim 1 wherein the molar ratio of lower alkyl ester of acrylic acid to cyanuric acid is from about 3:1 to about 5:1, and the product recovered is a lower alkyl ester of tri(2-carboxyethyl)isocyanurate.

3. The method of claim 2 wherein the lower alkyl ester of acrylic acid is ethyl acrylate.

4. The method of claim 3 wherein the catalyst is a quaternary organic ammonium base.

5. The method of claim 4 wherein said catalyst is trimethylbenzyl ammonium hydroxide.

6. The method of claim 5 wherein said solution is heated at a temperature of about 100–150° C.

7. The method of claim 6 wherein said solution contains dimethylformamide as a solvent.

8. The method of preparing lower alkyl esters of di- or tri(2-carboxyethyl)isocyanurate which comprises heating a solution of cyanuric acid and a lower alkyl ester of acrylic acid in the presence of a strongly alkaline catalyst and an antioxidant polymerization inhibitor and recovering the resultant lower alkyl ester of di- or tri(2-carboxyethyl)isocyanurate product.

9. The method of claim 8 wherein said antioxidant is hydroquinone.

No references cited.

WALTER A. MODANCE, *Primary Examiner.*

JOHN M. FORD, *Assistant Examiner.*